United States Patent [19]

Yamashita et al.

[11] 3,998,647

[45] * Dec. 21, 1976

[54] REVERSIBLE LIGHT-SENSITIVE GLASS

[75] Inventors: Toshiharu Yamashita, Hachioji; Tetsuro Izumitani, Hino, both of Japan

[73] Assignee: Hoya Glass Works, Ltd., Tokyo, Japan

[ * ] Notice: The portion of the term of this patent subsequent to Sept. 3, 1991, has been disclaimed.

[22] Filed: July 31, 1974

[21] Appl. No.: 493,430

[30] Foreign Application Priority Data

Dec. 29, 1973 Japan .................................. 49-551

[52] U.S. Cl. ............................ 106/54; 106/DIG. 6
[51] Int. Cl.$^2$ ........................ C03C 3/26; C03C 3/08
[58] Field of Search .......................... 106/DIG. 6, 54

[56] References Cited

UNITED STATES PATENTS

| 3,540,793 | 11/1970 | Araujo | 106/DIG. 6 |
| 3,833,511 | 9/1974 | Yamashita et al. | 106/DIG. 6 |

OTHER PUBLICATIONS

Yohota, R., "Phototropic Glass," Kotai Butsuri, 1968 3(5)265–269, in Chem. Abstract vol. 69, 1968, 72798p.

Primary Examiner—Winston A. Douglas
Assistant Examiner—Mark Bell
Attorney, Agent, or Firm—Sughrue, Rothwell, Mion, Zinn & Macpeak

[57] ABSTRACT

A reversible light-sensitive glass comprising 100 parts of a base glass composition consisting, in weight percent, of 48 to 62% $SiO_2$, 15 to 22% $B_2O_3$, 0 to 7% $Al_2O_3$, 0 to 10% $ZrO_2$, 6 < $Al_2O_3 + ZrO_2$ < 12%, 6 to 16% $R_2O$ where R represents Li, Na or K, 0.5 to 7% BaO, $BaO/R_2O$ 0.035 to 0.65, 0 to 2% $TiO_2$, and 0.002 to 0.03% CuO, and as light-sensitive components, 0.15 to 1.0 part of Ag and more than the chemical Ag equivalent of halogens selected from the group consisting of Cl, Br and I.

1 Claim, 1 Drawing Figure

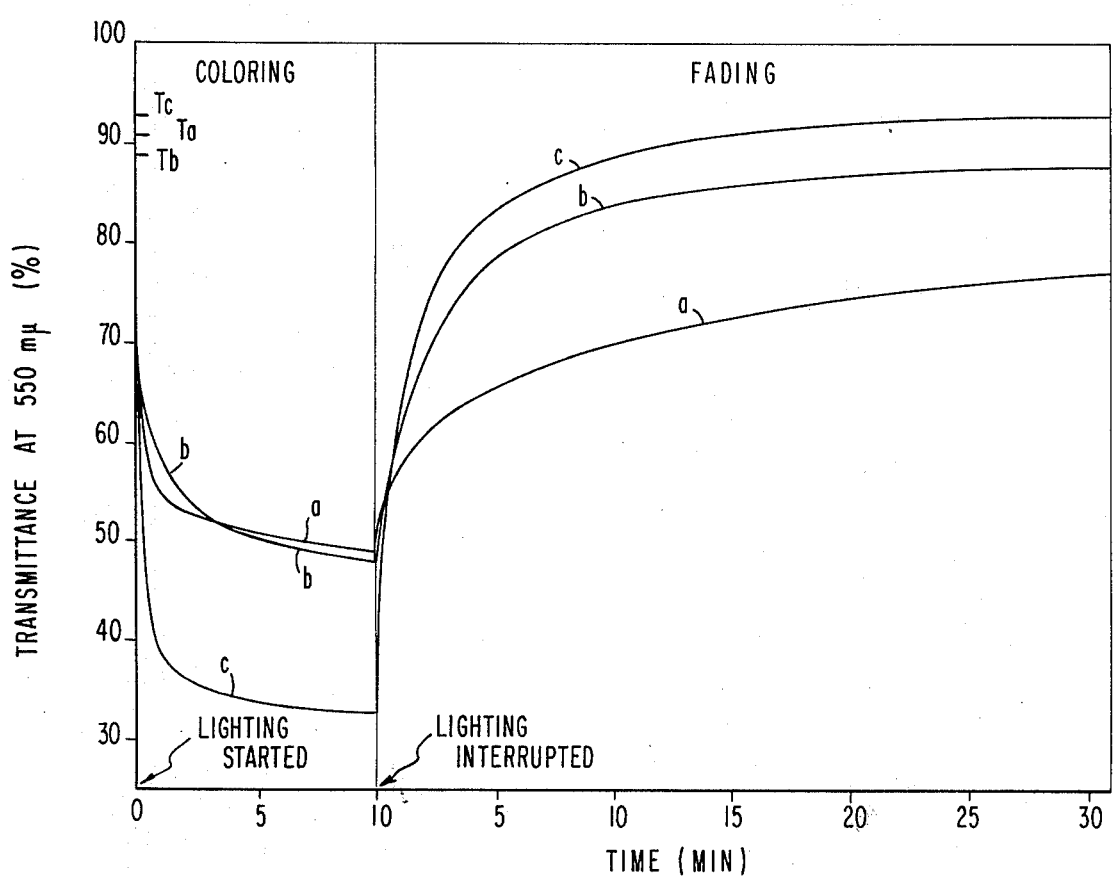

REVERSIBLE LIGHT-SENSITIVE GLASS

BACKGROUND OF THE INVENTION

1. FIELD OF THE INVENTION

This invention relates to a reversible light-sensitive glass having a refractive index of 1.5 to 1.55, in which the percent transmission of the glass changes abruptly and reversibly due to irradiation with ultraviolet light and visible light of short wavelengths.

2. DESCRIPTION OF THE PRIOR ART

Generally, it is a matter of course that using reversible light-sensitive glasses as light-shielding eyeglass lenses, those light-sensitive glasses having fast light-response are desired. If the refractive index of the glass can be increased, the thickness of the eyeglass lenses can be reduced. Furthermore, if the refractive index is adjusted to 1.523, polishing devices and measuring devices for eyeglass lenses in general can be used without modification.

However, it has been difficult to adjust the refractive index to this value without reducing the light response, especially the rate of fading, and also with a stable composition in which the precipitation of crystals other than silver halide crystals does not occur.

A reversible light-sensitive glass having superior light response as disclosed in U.S. patent application Ser. No. 232,667, filed Mar. 8, 1972, has already been provided. This glass was prepared as a result of finding the effect of the co-presence of BaO and $K_2O$ in the base glass, and when the amount of BaO is restricted in order to maximize the light response and the rate of fading, it is impossible to increase the refractive index ($n_d$) to more than 1.50.

A reversible light-sensitive glass having a refractive index ($n_d$) of at least 1.50 and having superior light response as described in U.S. patent application Ser. No. 457,304, filed Apr. 2, 1974, has also been provided. This glass has an increased refractive index as a result of incorporating $TiO_2$, $ZrO_2$ and $Nb_2O_5$ into the glass of the above described U.S. patent application Ser. No. 232,667, filed Mar. 8, 1972, now U.S. Pat. No. 3,833,511. In order to prevent strong coloration caused by the introduction of $TiO_2$, it was necessary to incorporate a small amount of $As_2O_3$ or $Sb_2O_3$. However, it is difficult to obtain a glass having stable light responding properties by the introduction of $As_2O_3$ or $Sb_2O_3$. Furthermore, in the above application, a characteristic feature resides in a composition having a relatively larger proportion of $Al_2O_3$, but the introduction of $ZrO_2$ into such a composition brings about an increase in the liquidus temperature of the glass and thus a reduction in its thermal stability. This results in the precipitation in the glass of crystals other than silver halide crystals, and makes it difficult to obtain a reversible light-sensitive glass having excellent transparency.

In the reversible light-sensitive glasses now commercially available, the proportion of BaO is increased and also PbO, which adversely affects the light response and the rate of fading, is introduced in order to adjust the refractive index to 1.523. As a result, the resulting glass has a slow light response, especially a slow rate of fading, and more than 60 minutes is required for 90% of the coloration to disappear.

Furthermore, many of the reversible light-sensitive glasses of this kind do not have an entirely satisfactory weatherability which is required especially for glasses which tend to be exposed directly to the outer atmosphere.

SUMMARY OF THE INVENTION

Accordingly, a first object of this invention is to provide a reversible light-sensitive glass having a fast light response and a fast rate of fading and a refractive index of 1.523.

A second object of the invention is to provide a reversible light-sensitive glass having a low liquidus temperature and excellent transparency in which precipitation of crystals other than silver halide crystals during manufacture does not occur.

A third object of this invention is to provide a reversible light-sensitive glass having a sufficiently high weatherability.

The present invention has been accomplished on the basis of the discovery that the above objects are achieved by the introduction of $TiO_2$ and $ZrO_2$ into the composition, as refractive index-increasing component, limiting the proportion of $TiO_2$ to a small amount, and incorporating $ZrO_2$ in a composition having a small proportion of $Al_2O_3$; that this provides a thermally stable glass having a refractive index of at least 1.50 and a low liquidus temperature; and that the light responding properties and chemical durability are somewhat improved over a composition having a large proportion of $Al_2O_3$.

This invention provides a reversible light-sensitive glass comprising 100 parts of a base composition consisting, in weight percent, of 48 to 62% $SiO_2$, 15 to 22% $B_2O_3$, 0 to 7% $Al_2O_3$, 0 to 10% $ZrO_2$, $6 < Al_2O_3 + ZrO_2 < 12\%$, 6 to 16% $R_2O$ where R represents Li, Na or K, 0.5 to 7% BaO, a $BaO/R_2O$ weight ratio of 0.035 to 0.65, 0 to 2% $TiO_2$, and 0.002 to 0.03% CuO, and as light-sensitive components, 0.15 to 1.0 part of Ag and more than the chemical Ag equivalent of halogens selected from the group consisting of Cl, Br and I.

BRIEF DESCRIPTION OF THE DRAWING

The drawing is a diagram showing the coloration-fading curves of a commercially available reversible light-sensitive eyeglass, the glass of U.S. patent application Ser. No. 457,304, filed Apr. 2, 1974, and the glass in the example of the present invention, with curves a, b, c showing the coloration-fading curves of a commercially available glass, the glass of U.S. patent application Ser. No. 457,304, filed Apr. 2, 1974 and the glass in the example of the present invention, respectively; and with Ta, Tb and Tc showing the percent transmissions before coloration of the above three glasses, respectively.

DETAILED DESCRIPTION OF THE INVENTION

Conventional borosilicate glasses containing a large amount of $B_2O_3$ and a relatively small proportion of alkali metal oxides, that is, the so-called phase-separating glasses, generally contain $Al_2O_3$ for the purpose, for example, of inhibiting phase-separation and improving chemical durability. The incorporation of $TiO_2$ or $ZrO_2$ was believed to promote phase-separation and to render the glass thermally unstable. It was thought that $Al_2O_3$ was most effective in inhibiting phase-separation as well as in improving chemical durability, and a decrease in the content of $Al_2O_3$ reduced the chemical durability. Glasses obtained by incorporating $TiO_2$ or $ZrO_2$ in a borosilicate glass are rare. Japanese Patent Publication No. 10048/1973 discloses a glass composition containing 0 to 7.1% of $ZrO_2$. However, according to the disclosure in this Japanese Patent Publication, $ZrO_2$ was incorporated into a composition containing PbO and a relatively large (6 to 10%) proportion of $Al_2O_3$, and this composition does not include $TiO_2$ at all.

In this invention, however, the refractive index increase component, $ZrO_2$, can be introduced without devitrification with a composition which does not contain PbO at all, and contains $Al_2O_3$ in a proportion of as relatively as small as 0 to 7.% Even if the content of $Al_2O_3$ is low, the chemical durability is not reduced, and the glass has very good thermal stability and good light response.

The following table shows the effects on thermal stability and chemical durability. Glass A containing a large amount of $Al_2O_3$ has a very high liquidus temperature and is thermally unstable, whereas Glass B containing a relatively small proportion of $Al_2O_3$ is very stable in spite of the fact that it contains the same proportion of $ZrO_2$. Also, the chemical durability of the glass of this invention scarcely changes even when the amount of $Al_2O_3$ is small. To the contrary, the chemical durability is improved.

| Component | Glass Composition | |
|---|---|---|
| | A | B |
| $SiO_2$ | 55.9 | 59.9 |
| $B_2O_3$ | 18.9 | 18.9 |
| $Al_2O_3$ | 10.0 | 6.0 |
| $ZrO_2$ | 4.0 | 4.0 |
| $Al_2O_3 + ZrO_2$ | 14.0 | 10.0 |
| $K_2O$ | 8.2 | 8.2 |
| $Li_2O$ | 1.8 | 1.8 |
| BaO | 1.2 | 1.2 |
| | | (wt.%) |
| Liquidus Temperature | Higher than 1260° C | Crystals not precipitated |
| Change in Appearance | Devitrified at 760 to 1260° C | No change at all |
| Acid Resistance (shown by weight loss) | 0.15% | 0.14% |

The liquidus temperature was measured by maintaining the glass for one hour in a conventional temperature gradient furnace.

In the present invention, the proportion of the refractive index increasing component, $TiO_2$, is not more than 2%, and by this, it is no longer necessary, as is done in US patent application Ser. No. 457,304, filed April 2, 1974, to use $As_2O_3$ in order to prevent coloration. As a result, a glass having stable light responding properties can be obtained. Moreover, no reduction in light sensitivity occurs since the absorption of ultraviolet light by the titanium ion is inhibited.

On the basis of the above-described means, the present invention has made it possible to obtain a thermally stable glass without decreasing the light responding properties and chemical durability, and provides a reversible light-sensitive glass comprising 100 parts of a base glass composition consisting, in weight percent, of 48 to 62% $SiO_2$, 15 to 22% $B_2O_3$, 0 to 7% $Al_2O_3$, 0 to 10% $ZrO_2$, 6<$Al_2O_3 + ZrO_2$<12%, 6 to 16% $R_2O$ (where R represents Li, Na or K), 0.5 to 7% BaO, a $BaO/R_2O$ ratio of 0.035 to 0.65, 0 to 2% $TiO_2$ and 0.002 to 0.03% CuO, and as light-sensitive components 0.15 to 1.0 part of Ag and more than the chemical Ag equivalent of halogens selected from the group consisting of Cl, Br and I.

If the proportion of $SiO_2$ is above 62% a glass having a high density of coloration and a high rate of fading cannot be obtained, and melting of the glass becomes difficult. If the proportion of $SiO_2$ is less than 48,%, the chemical durability of the glass is poor, and phase separation tends to occur during heat-treatment.

BaO even in a very small amount has the effect of markedly increasing the density of coloration, and the presence of $R_2O$, especially $K_2O$, has the effect of increasing the rate of fading. In order to obtain a density and a rate of fading sufficient for practical light-shielding eyeglass lenses, it is necessary that the $BaO/R_2O$ ratio should be at least 0.035 with the proportion of BaO being at least 0.5. However, when the proportion of BaO is higher than 7% and the $BaO/R_2O$ ratio is above 0.65, the density of coloration rather decreases, and the rate of fading also becomes slower. If the proportion of $R_2O$ is less than 6%, the effect of the $R_2O$ in the presence of BaO is weak, and if it is above 16%, the chemical durability of the glass is reduced and the rate of fading becomes slower.

If the proportion of $B_2O_3$ is less than 15%, the effect of the $B_2O_3$ in the presence of BaO and $R_2O$ is weak. Better results are obtained with larger proportions of $B_2O_3$, but if the proportion of $B_2O_3$ is above 22%, the glass becomes unstable, and both its transparency and chemical durability are reduced.

If the proportion of $Al_2O_3$ is above 7%, a stable glass having a refractive index of at least 1.5 cannot be obtained unless the amount of $ZrO_2$ to be incorporated is reduced, and thus, the objects of this invention cannot be achieved. Further, if the proportion of $ZrO_2$ exceeds 10%, not only does the glass become unstable, but also the rate of fading decreases. If the proportion of $Al_2O_3 + ZrO_2$ is less than 6%, a glass with good chemical durability cannot be obtained. If the proportion of $Al_2O_3 + ZrO_2$ exceeds 12%, the glass becomes unstable, and also, the rate of fading is adversely affected.

If the proportion of $TiO_2$ is above 2%, light absorption in the ultraviolet region increases deteriorating the light-sensitivity of the glass.

The light-sensitive components to be added to 100 parts of the base glass composition described above are 0.15 to 1.0 part of Ag and more than the chemical equivalent of halogens, e.g., up to about 2%. If the amount of Ag is less than 0.15 part, the amount of silver halide crystals precipitated in the glass is small, and a sufficient density of coloration cannot be obtained. If the amount of silver is above 1.0 part, a milk-white turbidity occurs in the glass, and the glass cannot be used for eyeglass lenses. If the amount of the halogens is less than the chemical equivalent of Ag, it is impossible to obtain sufficient density of coloration.

CuO in a small amount has an effect of increasing the density of coloration, but this effect is observed with an amount of 0.002 to 0.03%.

The following Examples of the present invention are given to explain the invention in greater detail. All components are expressed in % by weight.

| | Examples | | | | | |
|---|---|---|---|---|---|---|
| | 1 | 2 | 3 | 4 | 5 | 6 |
| $SiO_2$ | 58.9 | 56.4 | 52.0 | 52.9 | 59.9 | 59.9 |
| $B_2O_3$ | 18.9 | 18.9 | 18.9 | 18.9 | 18.9 | 18.9 |
| $Al_2O_3$ | 7.0 | 7.0 | 3.0 | 6.0 | 4.0 | 1.0 |
| $ZrO_2$ | 3.0 | — | 9.0 | 6.0 | 6.0 | 9.0 |

-continued

| Examples | | | | | | |
|---|---|---|---|---|---|---|
| K₂O | 8.2 | 8.2 | 8.2 | 8.2 | 8.2 | 8.2 |
| Na₂O | — | — | — | — | — | — |
| Li₂O | 1.8 | 1.8 | 1.8 | 1.8 | 1.8 | 1.8 |
| BaO | 2.2 | 6.2 | 6.2 | 6.2 | 1.2 | 1.8 |
| TiO₂ | — | 1.5 | — | — | — | — |
| Al₂O₃ + ZrO₂ | 10.0 | 7.0 | 12.0 | 12.0 | 10.0 | 10.0 |
| BaO/R₂O | 0.22 | 0.62 | 0.62 | 0.62 | 0.12 | 0.12 |
| Ag | 0.4 | 0.4 | 0.4 | 0.4 | 0.3 | 0.3 |
| Cl | 0.6 | 0.6 | 0.6 | 0.6 | 0.6 | 0.7 |
| Br | 0.5 | 0.5 | 0.5 | 0.5 | 0.5 | 0.4 |
| I | — | — | — | — | — | — |
| CuO | 0.008 | 0.008 | 0.008 | 0.008 | 0.006 | 0.006 |
| Refractive Index $n_d$ | 1.50057 | 1.51332 | 1.52415 | 1.52366 | 1.50835 | 1.51961 |
| Acid Resistance (shown by weight loss) Da(%) | 0.15 | 0.17 | 0.20 | 0.12 | 0.15 | 0.16 |
| Density of Coloration $D_f$ | 0.48 | 0.42 | 0.38 | 0.35 | 0.33 | 0.31 |
| Time Required for 90% Restoration of Transparency $T_{90}$(minutes) | 6.0 | 9.5 | 8.8 | 7.2 | 5.5 | 4.8 |

| | 7 | 8 | 9 | 10 | 11 | 12 |
|---|---|---|---|---|---|---|
| SiO₂ | 54.6 | 54.1 | 59.4 | 57.3 | 55.3 | 59.9 |
| B₂O₃ | 18.9 | 18.9 | 18.9 | 18.8 | 18.8 | 18.9 |
| Al₂O₃ | 4.5 | 0.5 | 1.0 | 1.0 | 1.0 | — |
| ZrO₂ | 6.0 | 10.0 | 8.0 | 8.0 | 8.0 | 7.5 |
| K₂O | 8.2 | 8.2 | 8.2 | 9.8 | 11.3 | 8.7 |
| Na₂O | — | — | — | — | — | — |
| Li₂O | 1.8 | 1.8 | 1.8 | 2.1 | 2.5 | 1.8 |
| BaO | 5.0 | 5.0 | 1.2 | 1.4 | 1.7 | 2.2 |
| TiO₂ | 1.0 | 1.5 | 1.5 | 1.5 | 1.5 | 1.5 |
| Al₂O₃ + ZrO₂ | 10.5 | 10.5 | 9.0 | 9.0 | 9.0 | 7.5 |
| BaO/R₂O | 0.50 | 0.50 | 0.12 | 0.124 | 0.133 | 0.22 |
| Ag | 0.3 | 0.3 | 0.3 | 0.4 | 0.3 | 0.3 |
| Cl | 0.6 | 0.6 | 0.7 | 0.6 | 0.8 | 0.8 |
| Br | 0.4 | 0.5 | 0.4 | 0.5 | 0.3 | 0.4 |
| I | — | — | — | — | — | — |
| CuO | 0.008 | 0.008 | 0.010 | 0.006 | 0.008 | 0.012 |
| Refractive Index $n_d$ | 1.52584 | 1.54309 | 1.52314 | 1.53128 | 1.53895 | 1.52926 |
| Acid Resistance (shown by weight loss) Da (%) | 0.09 | 0.15 | 0.13 | 0.10 | 0.13 | 0.18 |
| Density of Coloration $D_f$ | 0.43 | 0.34 | 0.44 | 0.44 | 0.39 | 0.36 |
| Time Required for 90% Restoration of Transparency $T_{90}$(minutes) | 9.2 | 8.1 | 2.4 | 6.4 | 9.8 | 5.6 |

| | 13 | 14 | 15 | 16 | 17 | 18 |
|---|---|---|---|---|---|---|
| SiO₂ | 61.4 | 57.4 | 58.9 | 59.3 | 59.0 | 56.6 |
| B₂O₃ | 19.5 | 18.3 | 18.9 | 18.8 | 19.0 | 18.9 |
| Al₂O₃ | 1.0 | 1.0 | 1.0 | 1.0 | 1.0 | 2.3 |
| ZrO₂ | 8.3 | 7.7 | 7.5 | 7.4 | 7.6 | 6.0 |
| K₂O | 4.7 | 13.6 | 8.2 | 8.2 | 6.8 | 8.2 |
| Na₂O | — | — | — | 1.9 | 0.9 | — |
| Li₂O | 3.0 | — | 2.8 | 0.9 | 1.8 | 1.8 |
| BaO | 0.5 | 0.5 | 1.2 | 1.1 | 2.3 | 5.0 |
| TiO₂ | 1.6 | 1.5 | 1.5 | 1.4 | 1.6 | 1.2 |
| Al₂O₃ + ZrO₂ | 9.3 | 8.7 | 8.5 | 8.4 | 8.6 | 8.3 |
| BaO/R₂O | 0.065 | 0.038 | 0.109 | 0.10 | 0.242 | 0.50 |
| Ag | 0.3 | 0.25 | 0.4 | 0.4 | 0.4 | 0.4 |
| Cl | 0.8 | 0.7 | 0.5 | 0.6 | 0.8 | 0.6 |
| Br | 0.3 | 0.4 | 0.6 | 0.5 | 0.1 | 0.4 |
| I | — | — | — | — | 0.3 | — |
| CuO | 0.004 | 0.010 | 0.008 | 0.008 | 0.012 | 0.015 |
| Refractive Index $n_d$ | 1.52548 | 1.51811 | 1.52988 | 1.51867 | 1.52705 | 1.52720 |
| Acid Resistance (shown by weight loss) Da (%) | 0.25 | 0.20 | 0.09 | 0.20 | 0.17 | 0.20 |
| Density of Coloration $D_f$ | 0.28 | 0.29 | 0.30 | 0.33 | 0.41 | 0.33 |
| Time Required for 90% Restoration of Transparency $T_{90}$(minutes) | 2.6 | 2.4 | 4.5 | 3.3 | 5.9 | 6.8 |

| | 19 | 20 | 21 | 22 | 23 | 24 |
|---|---|---|---|---|---|---|

-continued

| | Examples | | | | | |
|---|---|---|---|---|---|---|
| $SiO_2$ | 59.3 | 59.4 | 57.6 | 61.4 | 57.4 | 58.4 |
| $B_2O_3$ | 16.8 | 21.0 | 18.6 | 16.8 | 20.9 | 19.2 |
| $Al_2O_3$ | 1.0 | 1.0 | 1.0 | 1.0 | 1.0 | 1.2 |
| $ZrO_2$ | 8.0 | 8.0 | 7.9 | 8.0 | 8.0 | 6.1 |
| $K_2O$ | 9.8 | 6.6 | 8.1 | 8.3 | 8.2 | 8.3 |
| $Na_2O$ | — | — | — | — | — | 0.9 |
| $Li_2O$ | 2.2 | 1.5 | 1.8 | 1.8 | 1.8 | 1.8 |
| BaO | 1.4 | 0.9 | 3.4 | 1.2 | 1.2 | 2.8 |
| $TiO_2$ | 1.5 | 1.5 | 1.5 | 1.5 | 1.5 | 1.3 |
| $Al_2O_3 + ZrO_2$ | 9.0 | 9.0 | 8.9 | 9.0 | 9.0 | 7.3 |
| $BaO/R_2O$ | 0.117 | 0.111 | 0.343 | 0.119 | 0.120 | 0.255 |
| Ag | 0.4 | 0.30 | 0.40 | 0.40 | 0.35 | 0.35 |
| Cl | 1.0 | 0.6 | 0.7 | 0.4 | 0.6 | 0.8 |
| Br | — | 0.5 | 0.6 | 0.7 | 0.5 | 0.3 |
| I | — | — | — | — | — | — |
| CuO | 0.006 | 0.006 | 0.012 | 0.008 | 0.008 | 0.008 |
| Refractive Index $n_d$ | 1.53498 | 1.52002 | 1.53012 | 1.52690 | 1.51950 | 1.52630 |
| Acid Resistance (shown by weight loss) Da (%) | 0.08 | 0.25 | 0.15 | 0.08 | 0.20 | 0.14 |
| Density of Coloration $D_I$ | 0.46 | 0.30 | 0.34 | 0.30 | 0.29 | 0.37 |
| Time Required for 90% Restoration of Transparency $T_{90}$(minutes) | 10.0 | 1.5 | 7.0 | 4.0 | 2.6 | 8.3 |

| | 25 | 26 | 27 | 28 | 29 |
|---|---|---|---|---|---|
| $SiO_2$ | 58.8 | 56.8 | 58.3 | 56.2 | 58.1 |
| $B_2O_3$ | 19.5 | 18.5 | 18.8 | 18.9 | 19.1 |
| $Al_2O_3$ | 1.2 | 1.0 | 2.0 | 3.4 | 1.5 |
| $ZrO_2$ | 6.1 | 7.8 | 6.0 | 5.5 | 6.4 |
| $K_2O$ | 9.1 | 8.1 | 9.8 | 8.2 | 8.1 |
| $Na_2O$ | 0.5 | — | — | — | — |
| $Li_2O$ | 2.1 | 1.8 | 2.1 | 1.8 | 1.8 |
| BaO | 1.6 | 4.5 | 1.4 | 5.0 | 3.4 |
| $TiO_2$ | 1.3 | 1.5 | 1.5 | 1.0 | 1.5 |
| $Al_2O_3 + ZrO_2$ | 7.3 | 8.8 | 8.0 | 8.9 | 7.9 |
| $BaO/R_2O$ | 0.137 | 0.455 | 0.118 | 0.50 | 0.343 |
| Ag | 0.38 | 0.40 | 0.40 | 0.40 | 0.38 |
| Cl | 0.4 | 0.5 | 0.8 | 0.5 | 0.4 |
| Br | 0.4 | 0.6 | 0.3 | 0.6 | 0.7 |
| I | 0.3 | 0.1 | — | — | — |
| CuO | 0.010 | 0.008 | 0.010 | 0.015 | 0.012 |
| Refractive Index $n_d$ | 1.52553 | 1.53336 | 1.52471 | 1.52368 | 1.52561 |
| Acid Resistance (shown by weight loss) Da (%) | 0.18 | 0.18 | 0.10 | 0.10 | 0.15 |
| Density of Coloration $D_I$ | 0.32 | 0.40 | 0.37 | 0.39 | 0.40 |
| Time Required for 90% Restoration of Transparency $T_{90}$(minutes) | 6.0 | 8.9 | 8.1 | 8.1 | 5.5 |

In the present Examples, the density of coloration is shown by $D_1$ which is the increase in optical density caused by coloration.

The rate of fading is expressed in terms of the time $T_{90}$ (minutes) required for 90% restoration of transparency after the stopping the irradiation. For coloration, light was irradiated onto a glass plate having a thickness of 2 mm from a 500 W Xenon lamp light source separated at a distance of 50 cm.

For fading, the sample was allowed to stand in a dark place, and the percent transmission with regard to light of a wavelength of 550 m$\mu$ was measured with a spectral electrophotometer.

The glass of this invention can be obtained by mixing the desired raw materials of the glass, melting the glass batch in a platinum crucible or a ceramic crucible at a temperature between 1400° and 1500° C, and after agitation, casting the molten batch into a mold, or directly feeding it into a mold as required and pressing it. By heat-treating the resulting glass at a temperature between its transition point and its softening point for several minutes to several hours, a reversible light-sensitive glass can be obtained which has fast rates of coloration and fading and has a color preferred for use in eyeglasses.

As shown in the Examples, a glass having an $n_d$ of higher than 1.50 and good transparency has been successfully obtained in spite of the high density of coloration and the fast rate of fading. With commercially available reversible light-sensitive glasses, more than 60 minutes is required for a 90% restoration of transparency, whereas in the present invention, this period is shortened to 1.5 to 10 minutes. On the other hand, since the $n_d$ of the glass can be easily adjusted to 1.523, the necessity for using a polishing plate different from the standard plate has been eliminated.

For example, materials cosisting of 4357.5 g of $SiO_2$, 2542.5 g of $H_3BO_3$, 230 g of Al(OH)$_3$, 480 g of $ZrO_2$, 1170.0 g of $KNO_3$, 337.5 g of $Li_2CO_3$, 435.0 g of $Ba(NO_3)_2$, 75.0 g of $TiO_2$, 30.0 g of AgCl, 47.3 g of KCl, 78.8 g of KBr and 0.9 g of CuO were well mixed, and the mixture was melted for about 6 hours in a 3-liter platinum pot placed in an electric furnace at 1460° C. The molten mixture was cast into an eyeglass mold (65 mm $\phi$) and directly pressed. Then, immediately, the pressed glass was cooled in a lehr held at 300° C. The glass so obtained was not light sensitive. However, when this glass was heat-treated further at 620° C for 30 minutes, a marked light sensitivity on irradiation with ultraviolet rays was exhibited and the glass obtained has the reversible light-sensitive properties as shown in the drawing. This glass has a refractive index ($n_d$) of 1.52303 and exhibits a weight loss (acid resistance) of 0.14%. The turbidity of the glass of this invention due to light scattering is reduced as compared with the commercially available reversible light-sensitive eyeglass lenses.

The drawing shows the coloration-fading curves of the glass in the above example of this invention with other glasses, the commercially available reversible glass being shown by curve a, a glass in accordance with U.S. patent application Ser. No. 457,304 filed Apr. 2, 1974, being shown by curve b, and glass in the example of the present invention being shown by curve c. Ta, Tb and Tc respectively show the percent transmissions of the commercially available glass, the glass of U.S. patent application Ser. No. 457,304 filed Apr. 2, 1974, and the glass in the example of this invention, all before coloration.

While the invention has been described in detail and with reference to specific embodiments thereof, it will be apparent to one skilled in the art that various changes and modifications can be made therein without departing from the spirit and scope thereof.

What is claimed is:

1. A reversible light-sensitive glass comprising 100 parts of a base glass composition, in weight percent, of 48 to 62% $SiO_2$, 15 to 22% $B_2O_3$, 0 to 7% $Al_2O_3$, 0 to 10% $ZrO_2$, $6 < Al_2O_3 + ZrO_2 < 12\%$, 6 to 16% $R_2O$ where R represents Li, Na or K, 0.5 to 7% BaO, a $BaO/R_2O$ ratio of 0.035 to 0.65, 0 to 2% $TiO_2$, and 0.002 to 0.03% CuO, and as light-sensitive components, 0.15 to 1.0 part of Ag and more than the chemical Ag equivalent of halogens selected from the group consisting of Cl, Br and I.

* * * * *